Feb. 21, 1961 D. M. BLACKBURN 2,972,487
INDEXING MECHANISM
Filed April 24, 1959 8 Sheets-Sheet 4

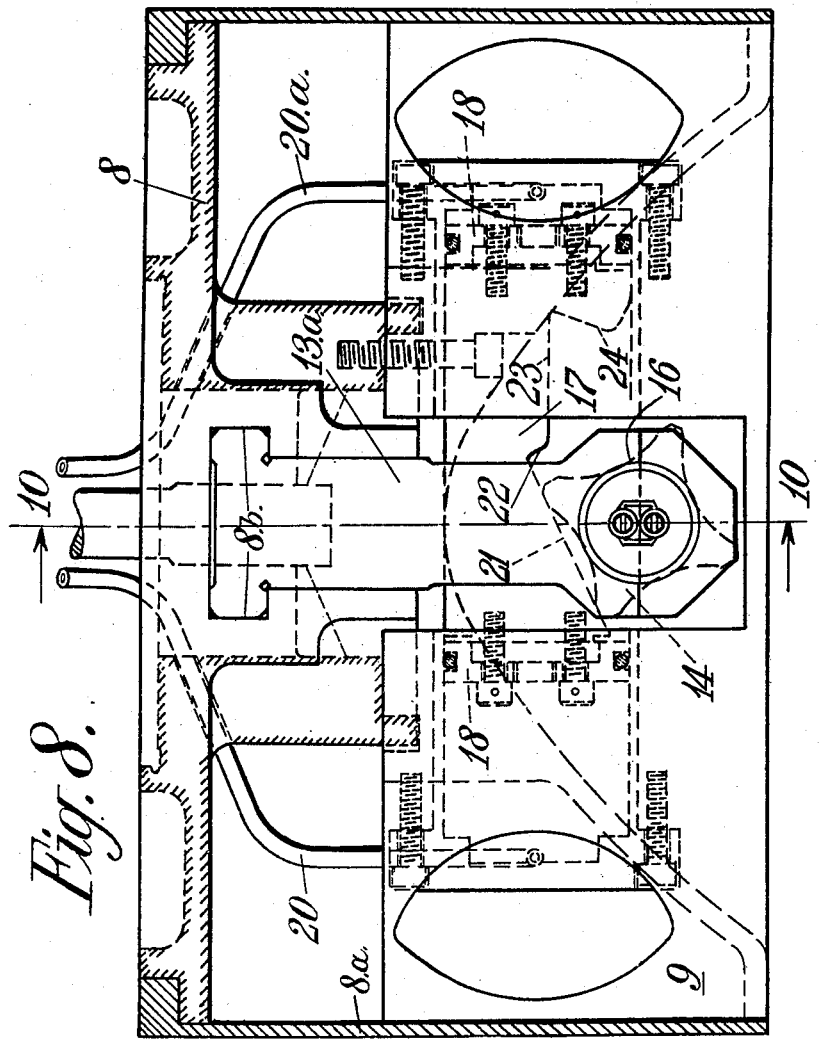

Feb. 21, 1961 D. M. BLACKBURN 2,972,487
INDEXING MECHANISM
Filed April 24, 1959 8 Sheets-Sheet 7

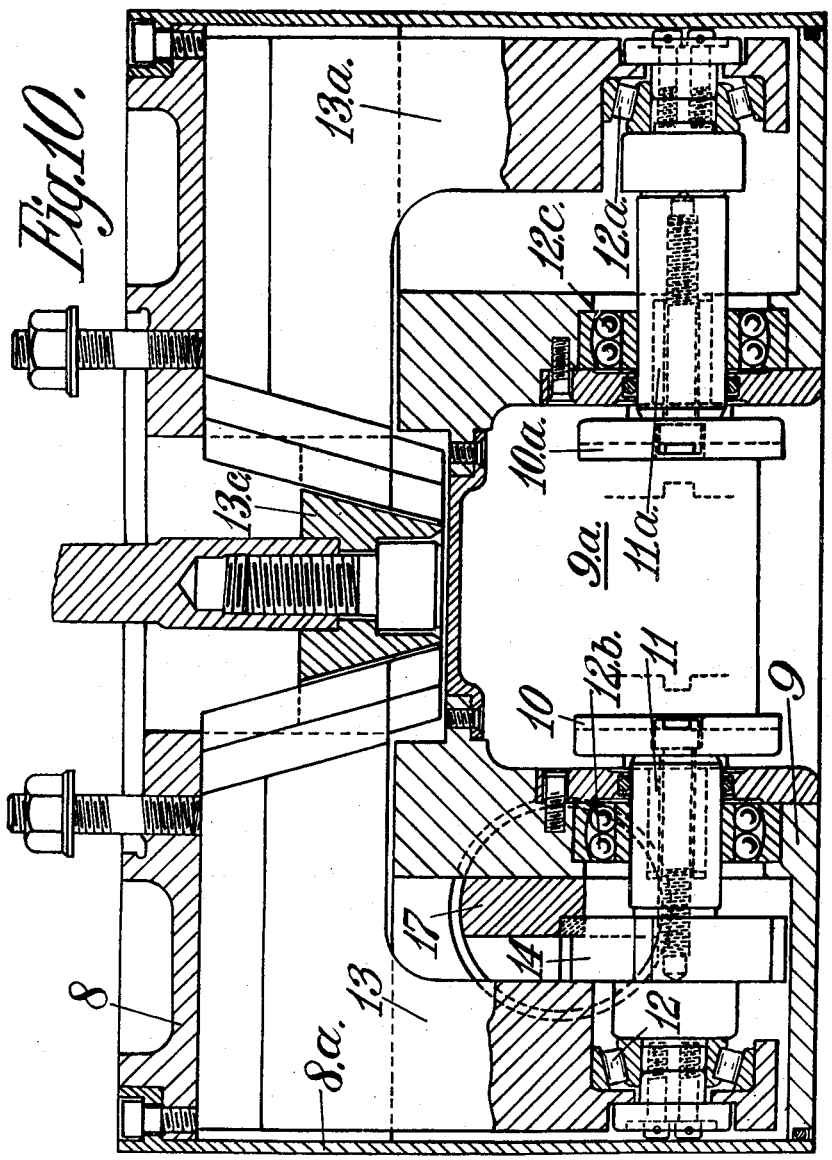

United States Patent Office 2,972,487
Patented Feb. 21, 1961

2,972,487
INDEXING MECHANISM

Donald Macpherson Blackburn, Johnstone, Scotland, assignor to John Lang & Sons, Limited, Johnstone, Scotland Filed Apr. 24, 1959, Ser. No. 808,763
Claims priority, application Great Britain May 7, 1958
6 Claims. (Cl. 279—5)

This invention has reference to indexing mechanism whereby a member can be indexed or moved step by step relative to another member and the first member stopped or indexed and positively locked at the end of each step.

One object of the invention is to provide improved indexing mechanism whereby the indexed member can be indexed with precision and positively locked in its indexed position, the accuracy being independent of any clearance of the relatively moving parts.

Another object of the invention is to provide a chuck with indexing tables and mechanism for indexing the tables with precision, the indexing mechanism being protected from chips, grit and the like.

According to the present invention the improved mechanism comprises a rotary member fast on or integral with a shaft or spindle, said rotary member having a series of contact faces positioned around its periphery, and an operating member mounted to reciprocate in a plane transverse to the rotary member and its shaft or spindle, said operating member having an inclined face terminating in a shoulder and a second shoulder spaced from the first shoulder, and means for reciprocating said operating member, the construction and arrangement being such that when the operating member is moved in one direction the first shoulder engages with a contact face and thereby imparts a partial rotary movement to the rotary member and thereafter the second shoulder engages with the next contact face to continue said rotary movement, and when the operating member is moved in the reverse direction the inclined face bears on the rotary member to correctly index and lock it in its new indexed position.

The invention further consists in indexing mechanism as set forth in the preceding paragraph wherein the operating member is carried by two end pistons working in cylinders to which pressure fluid can be alternately admitted and exhausted to impart the reciprocating movements to the operating member.

The invention further consists in a chuck for a lathe having a pair of opposed rotatably mounted indexing tables carried by the chuck jaws and between which the work piece can be clamped and mechanism for imparting rotary movements to said tables so that the work piece clamped between the tables can be indexed to present successively the faces thereof to the cutting tool of the lathe, said indexing mechanism comprising a rotatably mounted spindle carrying one of the tables and having integral therewith or fast thereon a rotary driving member provided with a series of circumferentially arranged contact faces corresponding in number to the number of positions in which the work piece is to be indexed, and an operating member extending transversely to said spindle and carrying at each end thereof a piston working within a fixed cylinder to which pressure fluid can be admitted and exhausted, said operating member having an axially extending inclined face terminating in a shoulder and spaced from said shoulder a second shoulder. The arrangement and construction is such that when the work piece is indexed the inclined face of the operating member bears on and locks said rotary member, pressure fluid in one cylinder holding the operating member and therefore the rotary member in such position. By exhausting pressure fluid from said cylinder and admitting pressure fluid to the other cylinder the operating member is moved axially and the first shoulder engages a contact face to impart a partial rotary movement to the table and the second shoulder thereafter engages the next contact face to continue said movement. On reversing the movement of the operating member the inclined plane co-operates with the rotary member to complete the indexing movement and lock the table in its next indexing position.

The invention also consists in a chuck as set forth in the preceding paragraph wherein the cylinders in which are fitted the pistons of the operating member are carried by the chuck body and the rotary driving member of the indexing table is capable of a transverse movement relative to the co-operating operating member so that the jaws carrying the clamping tables can be adjusted to clamp the work piece independently of the operating member of the indexing mechanism.

Preferred embodiments of the invention will now be described with reference to the accompanying drawings wherein:

Figure 8 is a plan of a further construction of chuck in accordance with the invention, its cylindrical casing being shown in section;

Figure 10 is a section on the line 10—10 of Figure 8; and

In the drawings like reference numerals indicate the same or corresponding parts.

Figure 1:
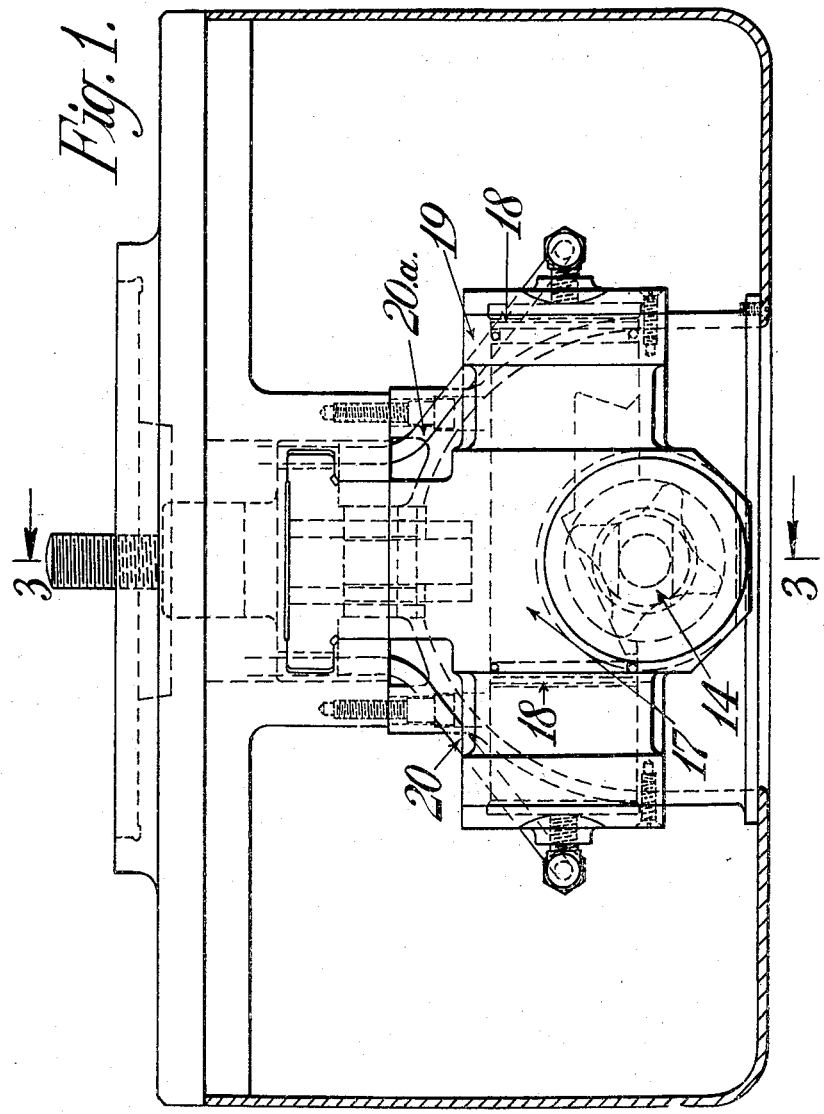
Figure 1 is a plan view of a chuck for a lathe, the chuck incorporating a preferred construction of indexing mechanism in accordance with the invention.
Figure 2:
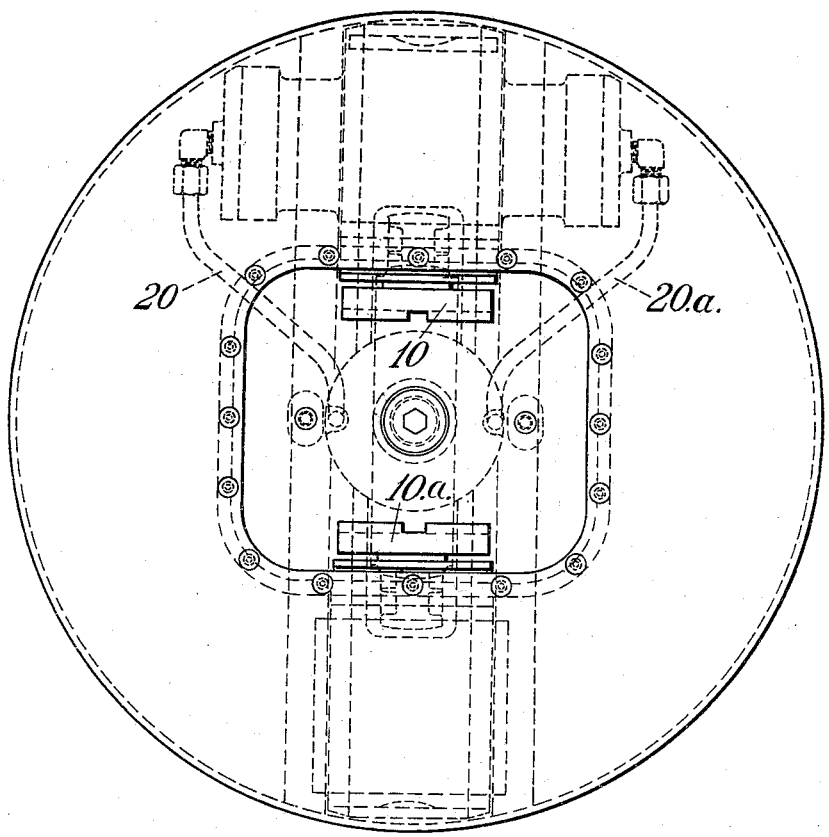
Figure 2 is an elevation thereof.
Figure 3:
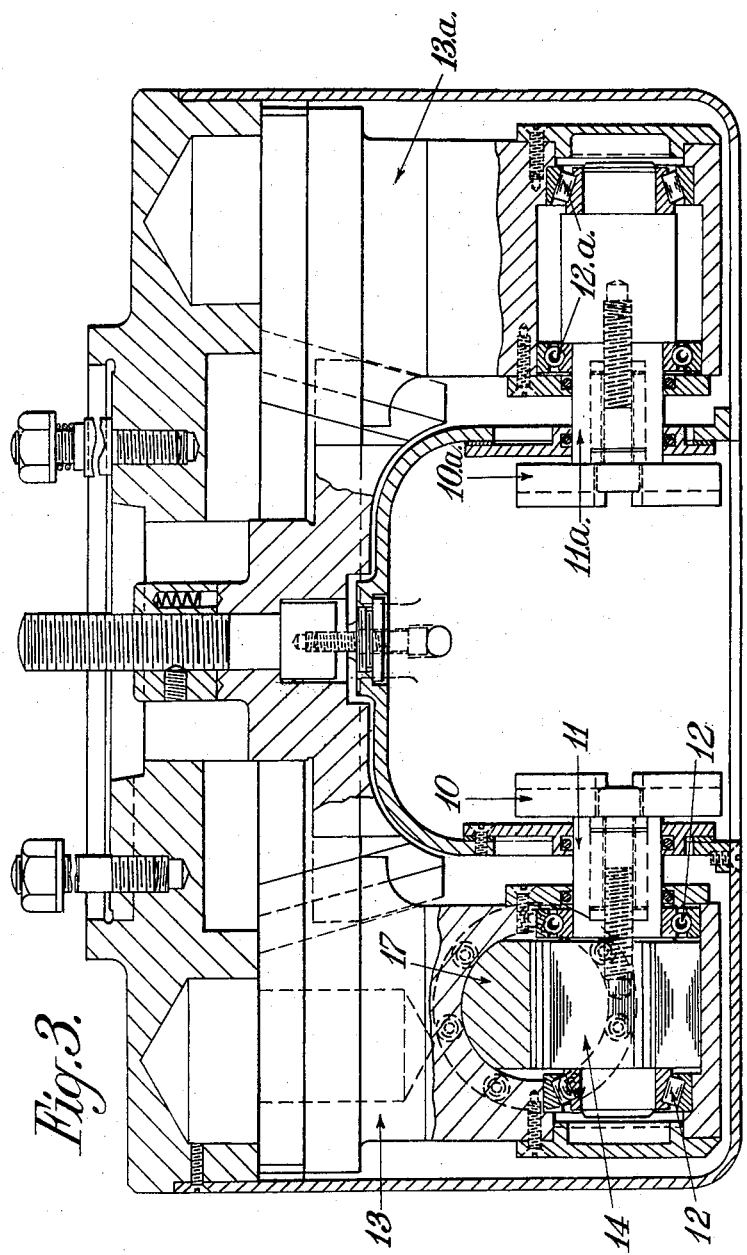
Figure 3 is a section on the line 3—3 of Figure 1.

As shown in Figures 1 to 7 the improved chuck is provided with a pair of opposed rotatably mounted indexing tables 10 and 10a. Said tables are fast on the inner ends of aligned spindles 11 and 11a and are rotatably supported in bearings 12 and 12a carried by the chuck jaws 13 and 13a. Said jaws are operated in known manner so that the indexing tables are caused to clamp therebetween the work piece, not shown. Spindle 11 has integral therewith a driving member 14 which is provided with a number of contact faces extending around its periphery. Said member is shown having contact faces formed by four flats 15, 15a, 15b and 15c, the flats between the corners being recessed or of concave formation as shown at 16 and the corners formed at the junction of the flats being rounded off.

Extending transversely of the driving member 14 is an operating member 17 each end of which carries a piston 18. The two pistons work in a cylinder 19 to the two ends of which pressure fluid can be admitted and exhausted through pipe lines 20 and 20a. Such admission and exhaust of the pressure fluid is controlled by a valve, not shown.

The operating member is provided with an axially extending face 21 which is inclined to bear on each flat in turn and thereby by its wedging action lock the rotary member 14 and table 10 in each of four indexed positions. The face 21 is slightly longer than the distance apart of adjacent contact faces.

Figure 4:
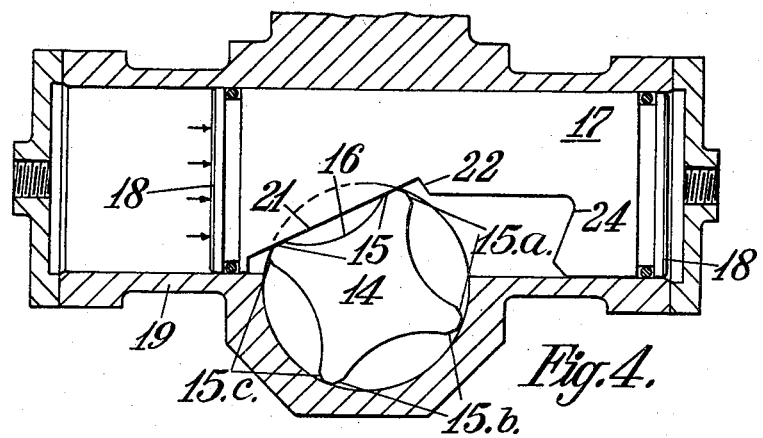
Figures 4, 5, 6 and 7 show successive positions of the indexing mechanism.

The upper end of the inclined face 21, viewed as in Figure 4, terminates in a shoulder 22 and from said shoulder the operating member is provided with an axially extending face 23 which in turn terminates in a second shoulder 24 which extends slightly forwards as shown in Figure 4.

It will be understood that the table 10a rotates in unison with the table 10 when a work piece is clamped between the two tables.

In describing the operation of the indexing mechanism it will be assumed that the work piece is clamped between the two tables and that the tables and work piece are locked in an indexed position by the inclined face 21 bearing on the flat as shown in Figure 4, the operating member being then urged to the right by pressure fluid acting on the left hand piston 18.

Figure 5:
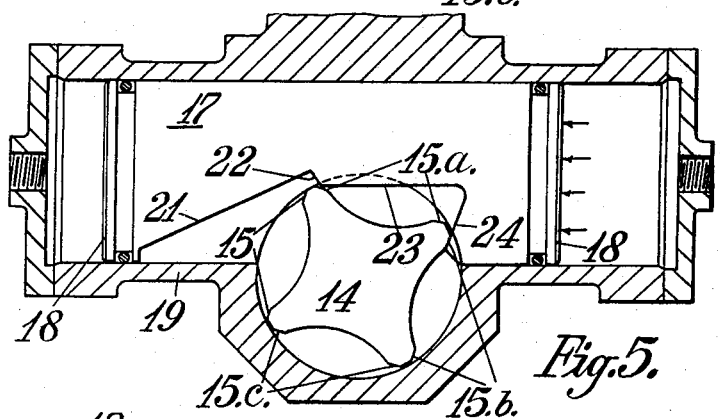
Figure 6:
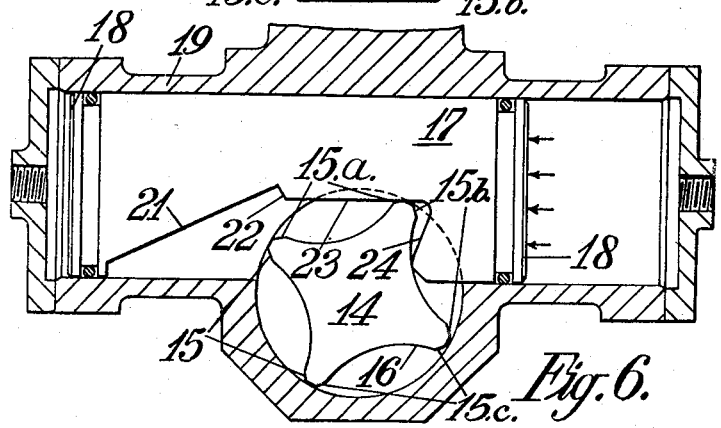

To index the work piece to its next position pressure fluid is exhausted through pipe line 20 and admitted through pipe line 20a so that the operating member is moved to the left. The initial movement results in the inclined face 21 being moved clear of the flat 15 and thereafter the shoulder 22 by co-operating with a flat 15a imparts a partial rotary movement in an anti-clockwise direction to the member 14 as shown in Figure 5. Further movement of the operating member in the same direction results in the shoulder 24 co-operating with the next flat 15b so that said rotary movement continues as shown in Figure 6. Such rotary movement is arrested when the corner formed by the flats 15a and 15b abut against the face 23.

Figure 7:
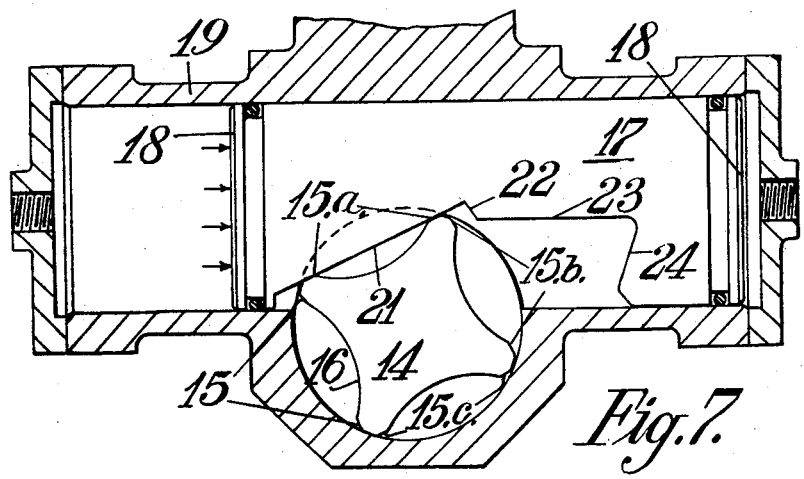
Figure 11:
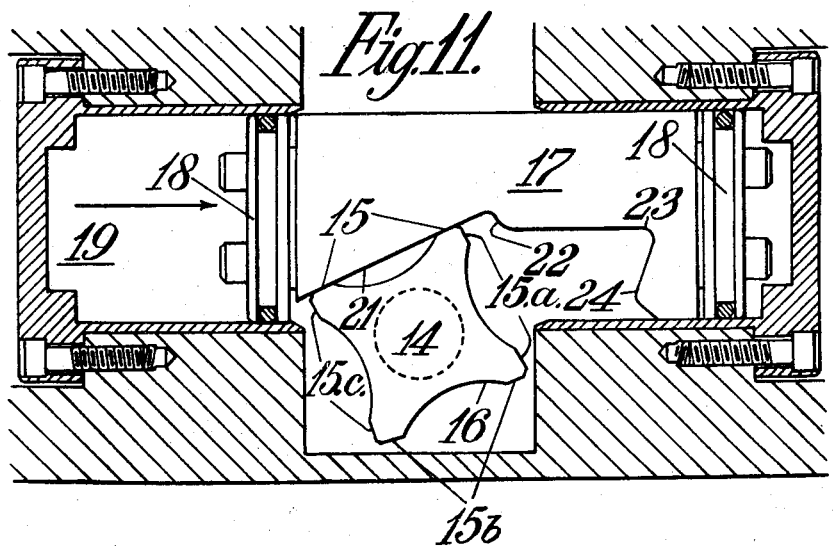
Figure 11 shows one position of the indexing mechanism.
Figure 9:
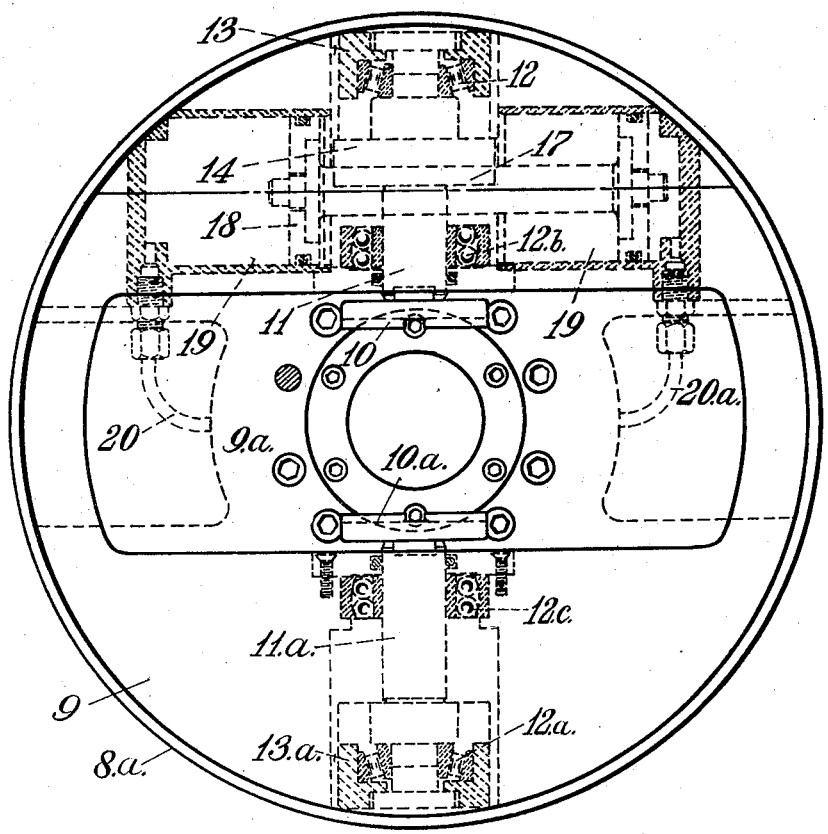
Figure 9 is a front elevation thereof.

Thereafter pressure fluid is exhausted from the right hand end of the cylinder 19 and admitted to the left hand end thereof so that the operating member is moved to the right. The inclined face 21 then co-operates with the aforesaid flat 15a to give the rotary member a small rotary movement in the same direction and lock said member together with the tables and work piece in its next indexed position. This position of the operating member and the rotary member is shown in Figure 7.

The aforesaid cycle of operations is repeated each time the operating member is reciprocated.

It will therefore be appreciated that the work piece can be given a partial rotary movement step by step in the same direction, correctly indexed at the end of the step and locked in its indexed position.

It will be understood that the rotary member may be provided with any desired number of flats so that it will be indexed in a corresponding number of positions during each rotation thereof.

It will be noted that the rotary driving member and its operating member are sealed so that chips, grit and the like cannot affect the precision of the indexing.

The invention has been particularly described as applied to a chuck for a lathe but it may be applied to any other machine or apparatus wherein one member has to be indexed relative to another.

In the modification of the invention shown in Figures 8 to 11 the chuck is provided with a chuck body comprising the chuck back 8, a cylindrical casing 8a and a front body 9 recessed as at 9a to accommodate the pair of opposed rotatably mounted indexing tables 10 and 10a. Said tables are fast on the inner ends of aligned spindles 11 and 11a and are rotatably supported in outer bearings 12 and 12a and by inner bearings 12b and 12c. The outer bearings 12 and 12a are carried by the chuck jaws 13 and 13a. Said jaws can slide radially in guides 8b formed in the chuck body back 8. The jaws are moved radially inwards and outwards in known manner by means of a wedge member 13c so that the indexing tables are caused to clamp therebetween the work piece, not shown. The inner bearings 12b and 12c are carried by the front body 9. Spindle 11 has integral therewith a driving member 14 which is provided with a number of contact faces extending around its periphery. Said member is shown having contact faces formed by four flats 15, 15a, 15b and 15c, the flats between the corners being recessed or of concave formation as shown at 16 and the corners formed at the junction of the flats being rounded off.

Extending transversely of the driving member 14 is an operating member 17 each end of which carries a piston 18. The two pistons work in cylinders 19 to the outer ends of which pressure fluid can be admitted and exhausted through pipe lines 20 and 20a. Such admission and exhaust of the pressure fluid is controlled by a valve, not shown.

The cylinders 19 are not carried by one of the chuck jaws but are carried by the front 9 of the chuck body.

The operating member 17 is constructed as described with reference to Figures 4 to 7.

It will be understood that the table 10a rotates in unison with the table 10 when a work piece is clamped between the two tables.

In clamping a work piece between the indexing tables the tables are moved axially towards each other by operating the chuck jaws 13 and 13a in known manner, the driven member then moving axially with respect to the operating member 17 which remains stationary.

The further operation of this embodiment of the invention need not be further described as it is similar to that described with reference to Figures 1 to 7.

It will be appreciated that in a chuck of relatively small dimension it would be difficult or impossible to accommodate therein cylinders 19 and operating member 17 with piston of suitable diameter if such cylinders had to move with one of the jaws. By mounting the said cylinders on the chuck casing and arranging that the rotary member can move transversely thereto cylinders 19 of appropriate diameter can be fitted in a relatively small chuck. The invention is not, however, restricted to chucks of any particular dimensions.

What we claim is:

1. Mechanism by which a member can be indexed or moved step by step relative to another member and the first member stopped and positively locked at the end of each step comprising a rotary member carried by a shaft or spindle, said rotary member having a series of contact faces positioned around its periphery, an operating member mounted to reciprocate in a plane transverse to the axis of the rotary member and its shaft or spindle, said operating member having an inclined face terminating in a shoulder and a second shoulder spaced from the first shoulder, said inclined face extending lengthwise of the operating member and being of a length greater than the distance between adjacent contact faces, and means for reciprocating said operating member, the construction and arrangement being such that when the operating member is moved in one direction the first shoulder engages with a contact face and thereby imparts a partial rotary movement to the rotary member and thereafter the second shoulder engages with the next contact face to continue said rotary movement, and when the operating member is moved in the reverse direction the inclined face bears on the rotary member to correctly index it in its new indexed position and also to exert a wedging action thereon to lock it in such position and prevent lateral play.

2. Indexing mechanism as claimed in claim 1 wherein the operating member is carried by two end pistons working in cylinders to which pressure fluid can be alternately admitted and exhausted to impart the reciprocating movements to the operating member.

3. A chuck for a lathe having a pair of opposed rotatably mounted indexing tables between which the work piece can be clamped, aligned spindles carrying said tables, at least the outer ends of the spindles being journalled in bearings carried by the chuck jaws, and mechanism for imparting rotary movements to said tables so that the work piece clamped between the tables can be indexed to present successively the faces thereof to the cutting tool of the lathe, said indexing mechanism comprising a rotatably mounted spindle carrying one of the tables and having integral therewith or fast thereon a rotary driving member provided with a series of circumferentially arranged contact faces corresponding in number to the number of positions in which the work piece is to be indexed, said driving member being carried by one of said spindles, and an operating member extending transversely to said spindle and carrying at each end thereof a piston working within a fixed cylinder to which pressure fluid can be admitted and exhausted, said operating member having an axially extending inclined face terminating in a shoulder and spaced from said shoulder, the inclined face being longer than the distance between adjacent contact faces, a second shoulder, the arrangement and construction being such that when the work piece is indexed the inclined face of the operating member exerts a wedge action on the rotary member to take up all clearance of the pistons in the cylinder and positively lock the rotary member in a definite position, pressure fluid in one cylinder holding the operating member and therefore the rotary member in such position, by exhausting pressure fluid from said cylinder and admitting pressure fluid to the other cylinder the operating member is moved axially and the first shoulder engages a contact face to impart a partial rotary movement to the table and the second shoulder thereafter engages the next contact face to continue said movement and on reversing the movement of the operating member the inclined face co-operates with the rotary member to complete the indexing movement and to exert the aforesaid wedge action and thereby lock the table in its next indexing position.

4. A chuck as claimed in claim 3 wherein the cylinders in which are fitted the pistons of the operating members are carried by the chuck body and the rotary driving member of the indexing table is capable of a transverse movement relative to the co-operating operating member so that the jaws carrying the clamping tables can be adjusted to clamp the work piece independently of the operating member of the indexing mechanism.

5. A chuck as claimed in claim 3 wherein the indexing tables are located in a recess in the chuck face and the rotary driving member together with its operating member are accommodated in one of the jaws of the chuck.

6. A chuck as claimed in claim 3 wherein the indexing tables are located in a recess in the chuck face and the rotary driving member together with its operating member are located in a sealed compartment in the chuck.

References Cited in the file of this patent
UNITED STATES PATENTS
2,643,132    Hunziker  _____ June 23, 1953